(12) United States Patent
Jones et al.

(10) Patent No.: US 7,965,707 B2
(45) Date of Patent: Jun. 21, 2011

(54) ADAPTABLE COMMUNICATION PROFILES IN TELEPHONE NETWORKS

(75) Inventors: Emanuele Jones, Ottawa (CA); Robert W. MacIntosh, Carp (CA); Dmitri Vinokurov, Ottawa (CA)

(73) Assignee: Alcatel Lucent, Paris (FR)

( * ) Notice: Subject to any disclaimer, the term of this patent is extended or adjusted under 35 U.S.C. 154(b) by 1130 days.

(21) Appl. No.: 11/133,268

(22) Filed: May 20, 2005

(65) Prior Publication Data

US 2006/0218283 A1    Sep. 28, 2006

(30) Foreign Application Priority Data

Mar. 10, 2005  (CA) ..................... 2500508

(51) Int. Cl.
*H04L 12/28*    (2006.01)
*G06F 15/16*    (2006.01)
(52) U.S. Cl. ....................... 370/389; 709/227
(58) Field of Classification Search .................... 370/389
See application file for complete search history.

(56) References Cited

U.S. PATENT DOCUMENTS

| | | | | |
|---|---|---|---|---|
| 7,509,349 | B2 * | 3/2009 | Celik .................... | 1/1 |
| 2002/0165969 | A1 * | 11/2002 | Gallant ................ | 709/227 |
| 2004/0266415 | A1 * | 12/2004 | Belkin et al. ......... | 455/415 |
| 2005/0197138 | A1 * | 9/2005 | Kaminsky et al. ..... | 455/456.1 |
| 2005/0285734 | A1 * | 12/2005 | Sheynman et al. ..... | 340/539.21 |
| 2006/0085341 | A1 * | 4/2006 | Grim et al. ............ | 705/50 |
| 2006/0156022 | A1 * | 7/2006 | Grim et al. ............ | 713/182 |
| 2006/0276179 | A1 * | 12/2006 | Ghaffari et al. ....... | 455/412.2 |

OTHER PUBLICATIONS

Rizzetto, et al., A Voice over IP Service Architecture fro Intergrated Communications, IEEE Network, May/Jun. 1999, p. 34-40, USA.
Georgescu, Service creation on Open Source SIP Proxies, XP007900594, Sep. 8, 2004.
Rebahi, The SIP Express Router, Franhofer Institut Fokus, Berlin, Germany, XP-002380063.

* cited by examiner

*Primary Examiner* — Daniel J Ryman
*Assistant Examiner* — John Blanton
(74) *Attorney, Agent, or Firm* — Kramer & Amado, P.C.

(57) ABSTRACT

A system and method are provided for providing multiple aliases and associated policy profiles for a user of a VoIP communication system. The user configures a multitude of aliases by the user wishes to be contacted, and associates with each alias a policy stored at a user terminal. The aliases are stored within the network so as to be associated with contact information for the user terminal. A proxy processes call requests by determining the contact information associated with an alias entered by a caller, and forwards the call request to the user terminal associated with the contact information. The user terminal determines the alias used by the caller, and processes the connection request in accordance with the policy. The invention allows users to add and delete aliases in order to effect temporary and private contact information. Calls can be handled depending on which alias was used by a caller, rather than on an identification of the device used by the caller. The proxy may also store proxy policies in association with the aliases and process call requests accordingly, such as billing a call request to a customer account specified by the proxy policy corresponding to the alias entered by a caller.

18 Claims, 5 Drawing Sheets

ADAPTABLE COMMUNICATION PROFILES IN TELEPHONE NETWORKS

FIELD OF THE INVENTION

The invention relates to call management by a user in VoIP telephony, and more particularly to the use of aliases.

BACKGROUND OF THE INVENTION

A user gives telephony contact information to other people so that the user may receive calls. Typically, a single piece of contact information (such as a telephone number) is provided by the user to a wide range of people and businesses, including friends, family, business contacts, employers, charitable organizations, and service providers such as credit card companies. The contact information may also be provided when completing forms for joining organizations and sports teams, for entering draws, for requesting consumer information, for subscribing to magazines, or for registering with an Internet organization. The contact information can also be passed to third parties unbeknownst to the user.

The vast number of people and organizations which can have access to the user's contact information can prove burdensome to the user, particularly with respect to telemarketing. Even when the caller is legitimate, the user has little way of knowing who is calling before answering the telephone. Whether a call is from a family member, a particular group of friends, another group of friends, from an employer, or from a potential client, the user must treat all such calls in the same manner until the user takes the call and the caller identifies himself or herself. The problem is compounded when the contact information is shared among several people, as in a family sharing a telephone line.

Systems for providing Caller Identification (Caller ID) can assist in identifying callers and screening unwanted callers, for example by allowing the user to identify the calling number as that of a particular friend. However, Caller IDs are limited in that they are tied to the calling device and not to the calling party. This results in a degree of caller anonymity on the part of the caller. The user can choose to block calls from unrecognized numbers, or to block calls from specified numbers, but in either case the problem of managing the call is based on the identification of the calling device. If calls from unrecognized numbers are blocked, a friend calling from someone else's phone or a public phone will be unable to reach the user. If calls from specified numbers are blocked, unwanted callers will reach the user when calling from devices not previously recognized by the user. In either case, the call is treated based on the device from which the call originates, and not based on who is actually making the call. Furthermore, Caller ID can be disabled by the calling party by using an anonymity service. And even if a caller is correctly identified using Caller ID, management of the call is limited to either blocking or allowing the call.

A user may wish to manage calls in other ways other than just blocking or allowing a call. For example, the user may wish to forward calls from certain callers to voicemail with a particular announcement, personally answer the call in a business like manner (e.g. "ABC Services, Peter speaking"), block calls from certain callers and play a specific message, or forward calls from certain users to another terminal.

Bell Teen Services™ allows up to four telephone numbers per residential line, with a distinctive ring for each number. This allows, for example, parents of a household to distribute one telephone number to their friends and contacts and a child to distribute a different telephone number to his or her friends. In this way, when the telephone rings it will be clear whether the caller is one of the child's friends or one of the parents' friends or contacts. However, the number of different telephone numbers is limited, and the numbers can only be chosen when setting up the service. Withdrawing the number is a slow process which cannot be performed solely by the user without the involvement of the service provider. Furthermore, the user's telephone treats each called number differently simply by presenting a different ring pattern.

A system which allowed a user to configure any number of personalized aliases at any time would allow the user to dynamically customize means by which he or she could be contacted, providing greater control by the user over his or her privacy. Use of temporary aliases would allow the user to distribute contact information of limited duration.

SUMMARY OF THE INVENTION

In accordance with one aspect of the invention, a method is provided for establishing connections in a Voice over Internet Protocol (VoIP) communication network. Multiple user-configurable aliases are stored in association with contact information of a user terminal. A call request for establishing a connection is received at a proxy, the call request including one of the aliases. Contact information associated with the alias included in the call request is determined. The connection is established to the user terminal. In one embodiment, for each alias a local policy is stored at the user terminal in association with the alias. The user terminal determines the alias included in the call request, and processes the call request in accordance with the local policy associated with the alias.

In accordance with another aspect of the invention, a user terminal for use in a VoIP communication network is provided. The user terminal includes a memory for storing at least one alias and at least one local policy, each local policy being associated with a respective alias. The user terminal includes an alias manager for communicating to a Registrar aliases which are to be added or deleted from association with contact information of the user terminal. The user terminal includes a call processor for receiving a call request from a proxy, for extracting a received alias from the call request, and for applying the local policy associated with the received alias.

In accordance with another aspect of the invention, a method is provided for processing a call request at a proxy in a VoIP communication network. A call request is received from a caller device. An alias entered by the user of the caller device is determined. Contact information associated with the alias is determined. A unique outgoing alias associated with the caller device is determined. The unique outgoing alias is inserted into the call request as a caller device identifier. The call request is forwarded a user terminal identified by the contact information. In one embodiment, a proxy policy associated with the alias entered by the user is determined, the proxy policy being stored at the proxy. The call request is processed in accordance with the proxy policy associated with the alias.

The methods and apparatus of the present invention allow a user to dynamically configure means by which he or she can be contacted. By allowing the user to configure aliases as he or she chooses, aliases can be tied to the user device for as long or as briefly as the user wishes. The user has control over who can contact him or her, and to be alerted of who is calling independent of the particular calling device. The user can configure the user device to perform different actions depending on which alias was used to contact the user device, such as displaying a description of the alias. For example, a user wishing to sell a car may create and distribute an alias for precisely that purpose. Potential purchasers will use the distributed alias, and the user will be alerted when a call is received from someone using the distributed alias, regardless of from where the caller is calling. This allows the user to ignore such calls when desired. Once the car is sold, the user can configure the user device to inform calls to the distributed alias that the car has been sold, and after a while disable the alias altogether.

BRIEF DESCRIPTION OF THE DRAWINGS

The features and advantages of the invention will become more apparent from the following detailed description of the preferred embodiment(s) with reference to the attached figures, wherein.

It will be noted that in the attached figures, like features bear similar labels.

DETAILED DESCRIPTION OF THE EMBODIMENTS

Figure 1:
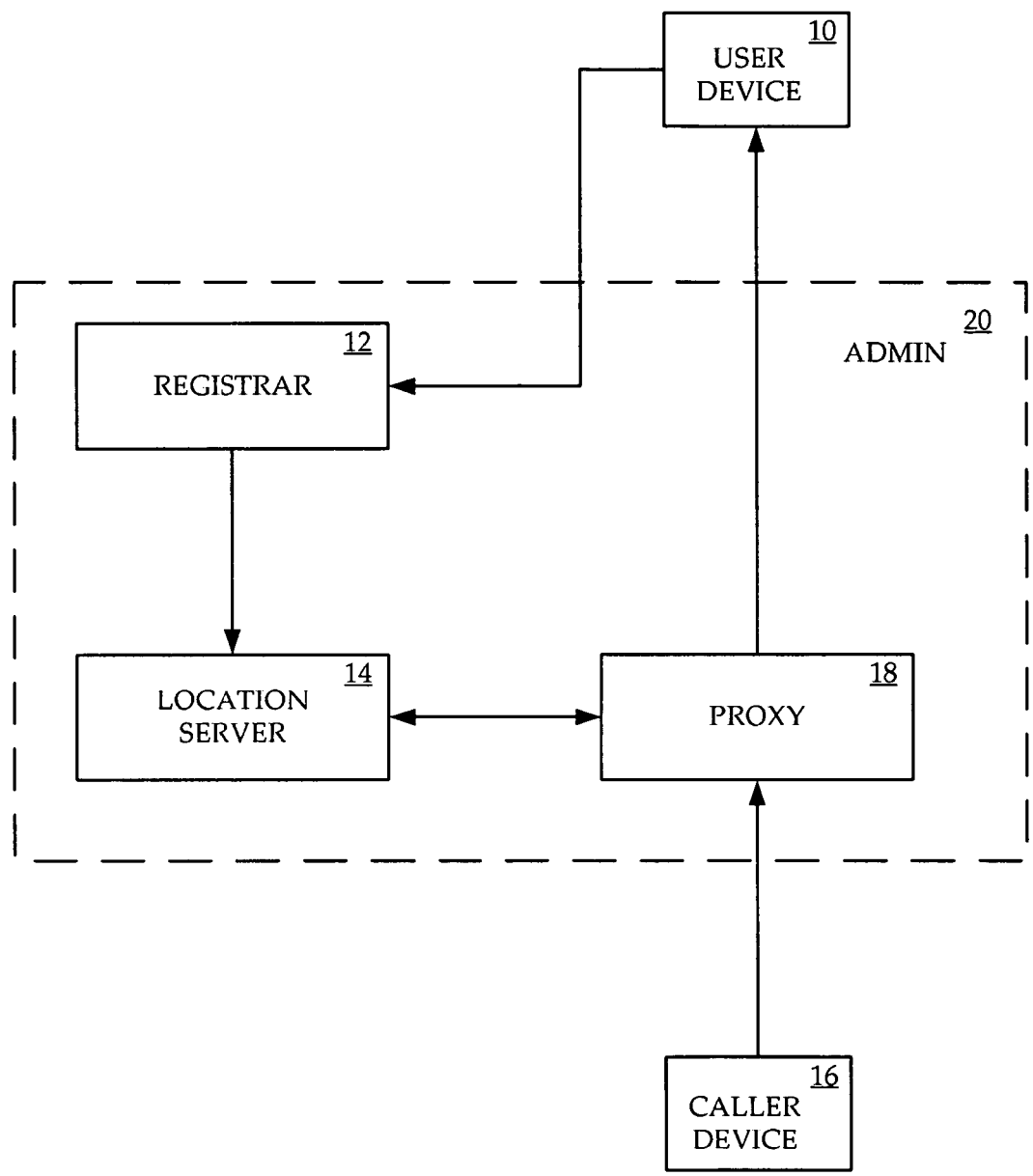
FIG. 1 is a block diagram of a portion of a communication network.

Referring to FIG. 1, a block diagram of a portion of a Voice Over Internet Protocol (VoIP) communication network is shown. A user receives calls through the communication network at a user device 10, such as a VoIP-enabled telephone. The user interacts with a registrar 12 through the user device 10 to manage user-defined aliases. The registrar 12 deposits the user-defined aliases on a location server 14. A caller wishing to contact the user accesses the communication network through a caller device 16, such as a VoIP-enabled telephone. The caller device 18 contacts a proxy 18, which consults the location server 14 to retrieve a contact address of the user device 10. The proxy 18 establishes a connection between the caller device 16 and the user device 10. The user device 10, registrar 12, location server 14, caller device 16, and proxy 18 are SIP-enabled devices and intercommunicate using SIP signaling, in conformance with J. Rosenberg et al., "SIP: Session Initiation Protocol", IETF RFC 3261, June 2002. The registrar 12, location server 14, and proxy 18 are preferably administered by a single administrative entity 20 which provides the adaptable communication profile service of the invention.

Broadly, in operation the user defines a set of at least one alias, and these user-configurable aliases are stored on the location server. The user also defines a respective local policy associated with each alias, and these local policies are stored at the user device. Each alias acts as an address-of-record, and is stored on the location server 14. The user distributes the aliases to people and organizations by whom the user wishes to be contacted. The definition and distribution of the aliases is entirely up to the user, the user entering aliases to be added to storage and specifying aliases to be deleted from storage, although the registrar ensures global uniqueness of any alias entered by the user. A caller wishing to contact the user will have been informed of one of the aliases by the user (for example, the user may say to the particular caller "You can reach me at this address"). The caller enters the alias at the caller device, and the alias is included in a call request received by the proxy. When the proxy receives the call request from the caller device, the proxy extracts the alias from the call request. The proxy determines from the location server the contact address that corresponds to the alias, the correspondence between the alias and the contact address having been defined by the user and entered in the location server through the registrar. The proxy establishes a connection between the caller device and the user device identified by the contact address corresponding to the alias. The proxy may also apply a proxy policy to the call request, the proxy policy being stored at the proxy. The user device receives the call request and extracts the alias from the signaling information. The user device determines the local policy associated with the alias, and applies the local policy.

Figure 2:
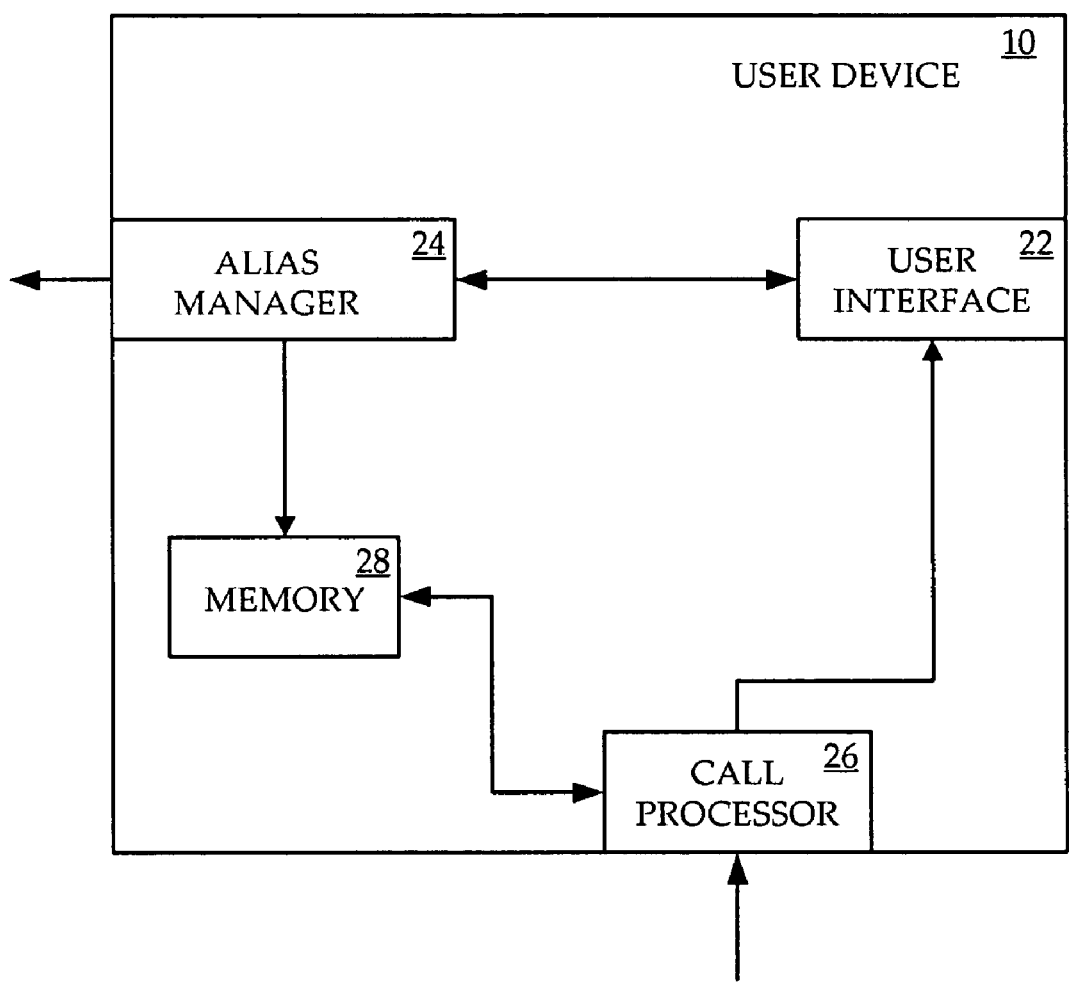
FIG. 2 is a block diagram of the user device of FIG. 1 according to one embodiment of the invention.

Referring to FIG. 2, a block diagram of the user device 10 according to one embodiment of the invention is shown. The user device 10 includes a user interface 22, through which the user interacts with an alias manager 24. The alias manager 24 can send SIP signals to the registrar 12. Call requests are received at the user device 10 through a call processor 26. The alias manager 24 and the call processor 26 each have access to a memory 28 of the user device 10. The call processor 26 displays information on the user interface 22.

The alias manager 24 and the call processor 26 are preferably in the form of software instructions within one or more processors in the user device 10, but may more generally be in the form of any combination of software and hardware, including hardware within an integrated circuit.

Figure 3:
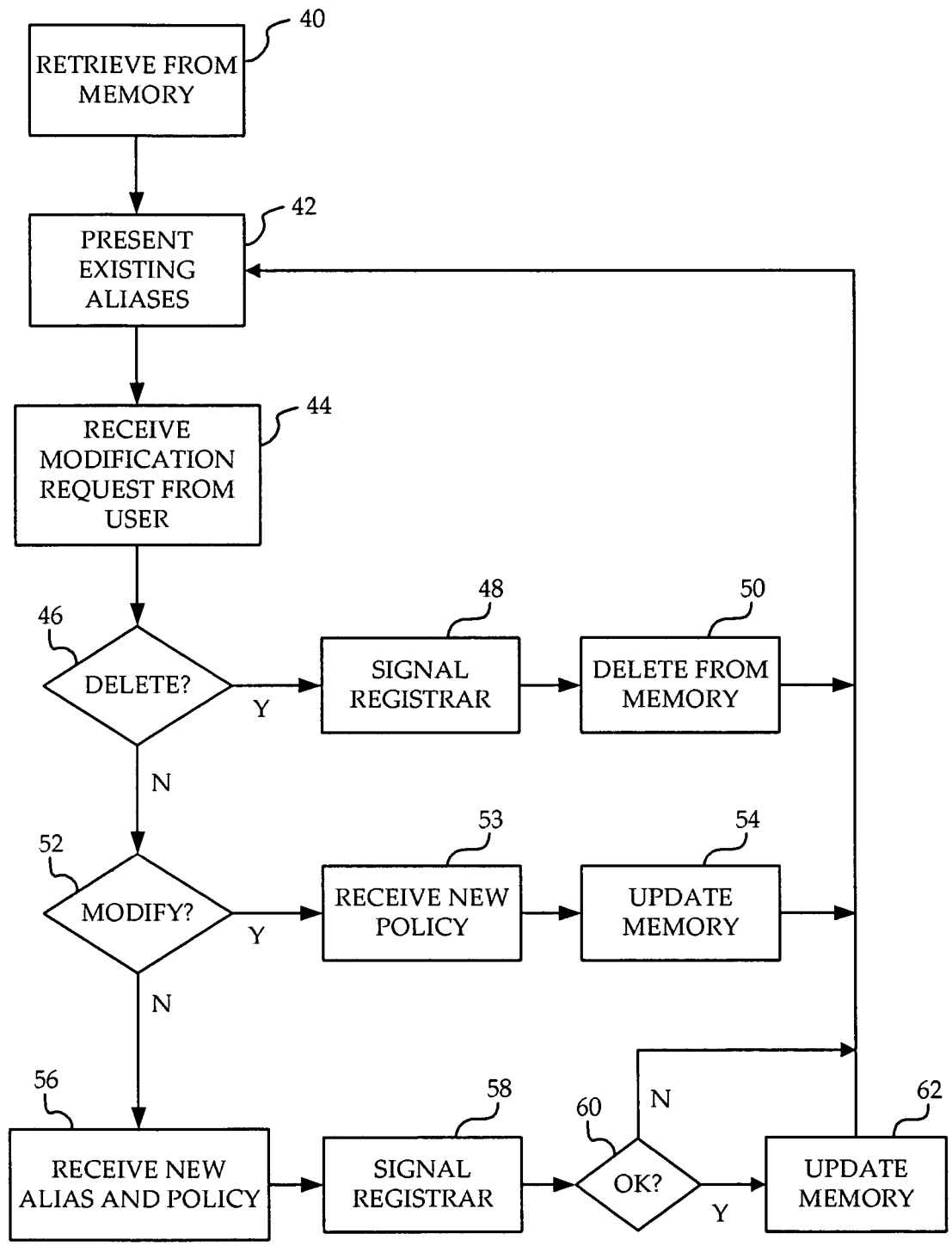
FIG. 3 is a flowchart of a method by which the alias manager of FIG. 2 configures aliases according to one embodiment of the invention.

Referring to FIG. 3, a method by which the alias manager 24 configures aliases according to one embodiment of the invention is shown. The method is executed when the user selects an alias management function through the user interface 22. At step 40 the alias manager 24 retrieves the current alias information, if any, from the memory 28. The alias information includes at least one alias and a corresponding local policy associated with each alias. The local policy preferably is a display name to be displayed on the user interface when receiving calls directed to the alias (for example, "Fred", "Family", "Car buyers"), but may additionally or alternatively include instructions for treating calls directed to the alias. Examples of such instructions for treating calls include redirecting the call to a different device or contact address, blocking the call, or playing a recorded message particular to the alias either when blocking a call or if the user does not answer the call.

At step 42 the alias manager 24 presents the current alias information to the user through the user interface 22, possibly in abbreviated form. At step 44 the alias manager 24 receives a modification request from the user through the user interface 22. If at step 46 the alias manager 24 determines that the modification request is to delete an alias, then at step 48 the alias manager 24 sends an SIP REGISTER signal to the registrar 12 indicating that the alias is to be no longer associated with the contact address of the user device, and deletes the alias and associated local policy from the memory 28 at step 50. The alias manager 24 then updates the display of the alias information at step 42.

If the alias manager 24 determines at step 46 that the modification request is not to delete an alias, then at step 52 the alias manager 24 determines whether the modification request is to modify an alias. If so, then at step 53 the alias manager 24 receives a new local policy to be associated with the alias, such as a new display name. At step 54 the alias manager 24 updates the memory 28 so as to include the new local policy, and updates the display of the alias information at step 42. No signaling to the registrar is needed, as the local policy is only stored locally on the user device 10.

If the alias manager 24 determines at step 52 that the alias is not to be modified, then the modification request is to add a new alias and associated local policy. At step 56 the alias manager 24 receives the new alias and the new local policy from the user through the user interface 22. At step 58 the alias manager 24 sends an SIP REGISTER signal to the registrar 12 identifying the new alias to be associated with the contact address of the user device 10. The registrar 12 ensures that the alias chosen by the user is unique to the domain of the user device, in order to ensure global uniqueness of the alias. The registrar 12 signals to the alias manager 24 whether the alias chosen by the user is acceptable. At step 60 the alias manager 24 learns whether the alias was acceptable. If the alias was acceptable, then at step 62 the alias manager updates the memory 28 to insert the new alias and the new associated local policy. Once the memory is updated, or if the alias was not acceptable, the alias manager 24 updates the display of the alias information at step 42.

In an alternative embodiment, the user can also make distinct selections to either delete both an alias and its associated policy, or to delete just the alias and leave the associated policy in memory. Deletion of just the alias allows the policy to be saved for future use in association with a new alias. In such an embodiment, the user is also given the option of retrieving a saved policy when creating a new alias, or of modifying a saved policy by assigning a new alias to the policy.

Figure 4:
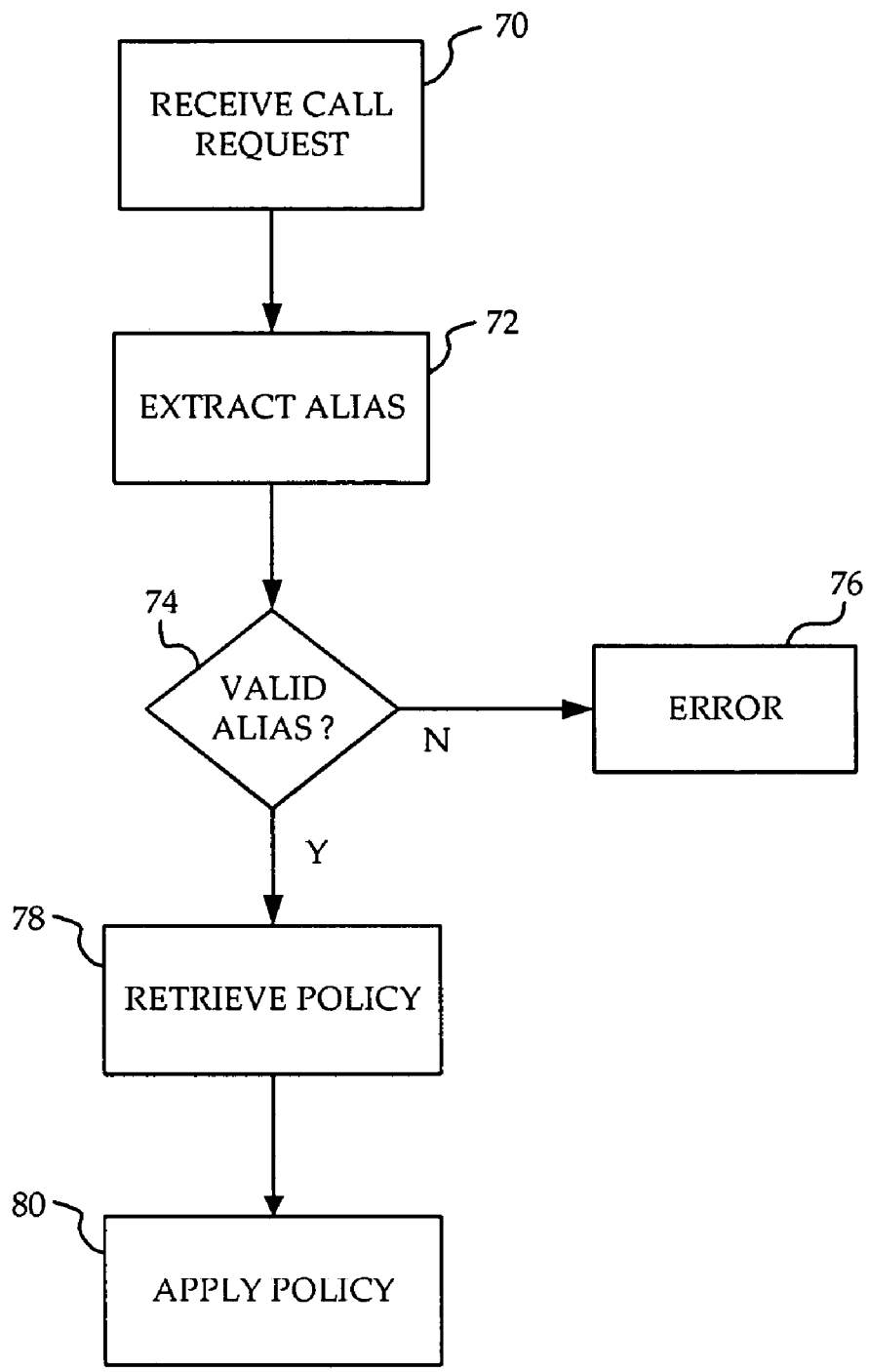
FIG. 4 is a flowchart of a method by which the call processor of FIG. 2 processes incoming calls according to one embodiment of the invention.

Referring to FIG. 4, a method by which the call processor 26 processes call requests received from the proxy according to one embodiment of the invention is shown. At step 70 the call processor 26 receives a call request from the proxy 20 in the form of an SIP INVITE signal. At 72 the call processor 26 extracts the alias of the connection request, which is stored in the SIP signal header information as the address-of-record. At step 74 the call processor 26 determines whether the extracted alias is valid by consulting the memory 28. Any alias contained in the SIP signal header should have been defined by the user and stored in the memory 28, as these are the only addresses-of-record which the proxy has for the user device 10. If at step 74 the call processor 26 is unable to locate the extracted alias within the memory 28 then the extracted alias is an invalid, and the call is rejected by the call processor 26. In the preferred embodiment, the call processor also alerts the user of the "false" alias, in order to inform the user that the aliases stored locally on the user device and the aliases registered through the registrar 12 have somehow become out-of-sync. If the call processor 26 determines at step 74 that the extracted alias is valid, then at step 78 the call processor 26 retrieves from memory 28 the local policy corresponding to the extracted alias. The call processor 26 applies the local policy at step 80.

In order to further protect the privacy of a user of the caller device 16 which also implements the adaptable communication profile system of the invention, the contact address of the caller device 16 should not appear on a Caller ID display of the user device 10. One solution would be to allow the caller to select one of the caller's aliases as the calling number. However, this would allow the caller to defeat any Caller Block function at the user device 10. In the preferred embodiment, the proxy 12 stores a unique outgoing alias for the caller device 16. The unique outgoing alias is generated by the user device when the user device registers itself with the network. Upon registration with the network, the user device generates a primary alias which is transmitted to the proxy, which stores the primary alias as the unique outgoing alias in association with the user device. The registration process ensures global uniqueness of the primary alias.

Figure 5:
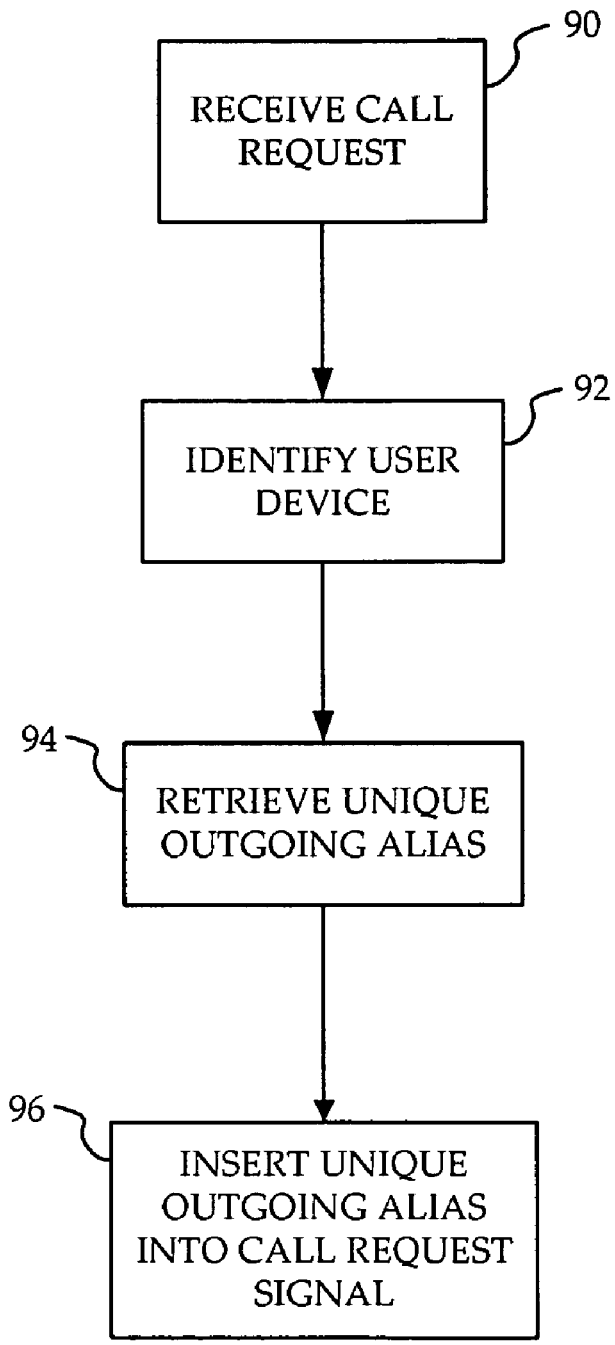
FIG. 5 is a flowchart of a method by which the proxy of FIG. 1 processes outgoing call requests according to one embodiment of the invention.

Referring to FIG. 5, a method by which the proxy 18 processes outgoing call attempts from the user device according to one embodiment of the invention is shown. At step 90 the proxy receives a call request from the user device 10 in the form of an SIP INVITE signal. At step 92 the proxy determines a unique identification of the user device, such as by extracting the contact address from the header information of the SIP INVITE signal. At step 94 the proxy retrieves the unique outgoing alias for the user device from a database or from memory. At step 96 the proxy generates an SIP INVITE signal to be sent to whichever device the user is trying to reach, inserting the outgoing alias into the header information of the SIP signal as a caller device identifier.

If anyone attempts to return the call to the user device using the user device's outgoing alias which appears on the called device's Caller ID display, the user device will apply an associated policy (created automatically by the user device upon registration with the network) of blocking the call. This allows the outgoing alias to be used exclusively for making outgoing calls, but not to be used for contacting the user device 10.

In one embodiment, the proxy 18 applies proxy policies to incoming calls to the user device 10. The proxy policies are configured in a memory of the proxy by the owner of the proxy. The proxy policies are configured by the owner of the proxy. When the proxy 18 extracts the address-of-record upon receipt of a connection request from the caller device 16, the proxy 18 consults a local memory to determine a proxy policy to be applied to the call. An example of a proxy policy is to bill charges associated with the call to a particular customer account specified by the proxy policy associated with the alias used by the caller. This allows, depending upon the application, a user, the owner of the proxy, or the owner of the user device to group calls to various aliases into separate billing accounts. For example, a company could distribute end user devices to employees and offer to pay for calls related to work. A "work" alias could then be defined for the user devices, and any calls made to the "work" alias would be billed by the proxy to the company.

As has been described above, the user configures and manages aliases through the user interface of the user device 10. In an alternative embodiment, the alias manager is located on an alias management interface device, which is a separate device from the user device which receives calls. For example, a management interface may be provided on a personal computer. The user enters aliases to be added to location server storage and specifies aliases to be deleted from location server storage at the alias management interface device. The alias management interface device communicates with the registrar using SIP signaling as described for the alias manager 24 described above. Once the user has configured aliases at the registrar using the alias management device, the user then updates aliases and local policies on the user device so that that aliases recognized by the user device will match aliases recognized by the proxy. In such an embodiment, the alias manager on the user device would not signal the registrar 12, and the steps 48, 58, and 60 of FIG. 3 would be omitted from the method carried out by the alias manager of the user interface.

The invention has been described as using local policies at the user device 10. In an alternative embodiment, the user device does not store local policies. The user can still manage call requests by creating and deleting aliases at his or her convenience, enabling only temporary communication from specific groups or people.

The invention has been described as implemented using SIP-enabled devices. This allows existing SIP signaling to be used during configuration of the aliases by the user, and existing address-of-record lookup methods to be used by the proxy. Alternatively, other VoIP signaling protocols can be employed. The methods and system of the invention may be implemented in a network employing any VoIP protocols which allow the storage of multiple aliases and the association of these aliases with contact information for a user terminal, and in which a proxy establishing a connection to the user terminal determines contact information from an alias entered by the caller.

The embodiments presented are exemplary only and persons skilled in the art would appreciate that variations to the embodiments described above may be made without departing from the spirit of the invention. Methods that are logically equivalent or similar to the methods described above with reference to FIG. 3, FIG. 4, and FIG. 5 may be used to implement the methods of the invention. The scope of the invention is solely defined by the appended claims.

We claim:

1. A method of establishing connections in a Voice over Internet Protocol communication network, comprising:

storing a plurality of user-configurable aliases in association with contact information of a user terminal by adding to storage an alias entered by a user of the user terminal and deleting from storage an alias specified by the user of the user terminal;

at a proxy, receiving a call request from a first device that establishes a connection to the user terminal, the call request including one of the aliases;

determining the contact information associated with the alias included in the call request;

determining a unique outgoing alias associated with the first device, wherein the user of the user terminal defines the unique outgoing alias, distributes the unique outgoing alias, and determines a local policy associated with each alias of the plurality of user-configurable aliases;

establishing the connection to the user terminal using the contact information;

displaying the unique outgoing alias on the user terminal; and blocking a subsequent call request when the user terminal attempts to initiate a call to the first device using the unique outgoing alias.

2. The method of claim 1, further comprising:

having the user of the user terminal enter the alias for addition to storage at the user terminal, and having the user of the user terminal specify the alias for deletion at the user terminal.

3. The method of claim 1, further comprising:

having the user of the user terminal enter the alias for addition to storage at an alias management interface device separate from the user terminal, and having the user of the user terminal specify the alias for deletion at the alias management interface device.

4. The method of claim 1, further comprising:

receiving a Session Initiation Protocol (SIP) REGISTER message identifying the alias.

5. The method of claim 1, further comprising:

for each alias, storing, at the user terminal, the local policy associated with the alias;

at the user terminal, determining the alias included in the call request; and at the user terminal, processing the call request in accordance with the local policy associated with the alias included in the call request.

6. The method of claim 5, further comprising:

playing a recorded message specified by the local policy associated with the alias.

7. The method of claim 6, further comprising:

playing the recorded message specified by the local policy associated with the alias when blocking the call request.

8. The method of claim 6, further comprising:

playing the recorded message specified by the local policy associated with the alias when the user of the user terminal does not answer the call request.

9. The method of claim 5, further comprising:

displaying at the user terminal a display name specified by the local policy associated with the alias.

10. The method of claim 9, further comprising:

displaying, at the user terminal, instructions for treating the call request directed to the alias as specified by the local policy associated with the alias.

11. The method of claim 5, further comprising:

forwarding the call request to a second user terminal specified by the local policy associated with the alias.

12. The method of claim 1, further comprising:

for each alias, storing, at the proxy, a proxy policy associated with the alias;

at the proxy, processing the call request in accordance with the proxy policy associated with the alias included in the call request.

13. The method of claim 12, further comprising:

billing the call request to a customer account specified by the proxy policy associated with the alias included in the call request.

14. The method of claim 12, further comprising:

consulting a local memory to determine the proxy policy to be applied to the call request.

15. The method of claim 1, further comprising:

at the proxy, determining the unique outgoing alias associated with The first device from which the call request is received; and when establishing the connection to the user terminal, inserting the unique outgoing alias as an identifier of the first device.

16. A method of processing a call request at a proxy in a Voice over Internet Protocol communication network, comprising:

receiving the call request from a caller device;

storing a plurality of user-configurable aliases in association with contact information of a user terminal by adding to storage an alias entered by a user of the user terminal and deleting from storage an alias specified by the user of the user terminal;

determining an alias entered by a user of the caller device, wherein the user of the user terminal defines the alias, distributes the alias, and determines a local policy associated with the alias;

determining contact information associated with the alias;

determining a unique outgoing alias associated with the caller device, wherein the user of the user terminal defines the unique outgoing alias;

inserting the unique outgoing alias into the call request as a caller device identifier;

forwarding the call request to a user terminal identified by the contact information; and blocking a subsequent call request when the user terminal attempts to initiate a call to the caller device using the unique outgoing alias.

17. The method of claim 16, further comprising:
determining a proxy policy associated with the alias entered by the user of the user terminal, the proxy policy being stored at the proxy;
processing the call request in accordance with the proxy policy associated with the alias.

18. The method of claim 17, further comprising:
billing the call request to a customer account specified by the proxy policy.

* * * * *